Patented Feb. 18, 1936

2,031,108

UNITED STATES PATENT OFFICE 2,031,108

PROCESS FOR REMOVING WAX FROM OIL

Basil Hopper, Palos Verdes Estates, Calif., assignor to Union Oil Company of California, Los Angeles, Calif., a corporation of California No Drawing. Application May 6, 1935,
Serial No. 20,053

6 Claims. (Cl. 196—19)

The present invention relates to a process for separating wax from wax-containing oils in the presence of added dewaxing aids. More particularly, it relates to a process for separating wax from oils such as wax-containing petroleum distillates by the addition of asphalts which are substantially free from resinous materials.

I have discovered that by adding a small quantity of a resin-free asphalt to wax-containing oil before effecting chilling of the oil or solution of oil and diluent to precipitate or congeal the wax, the resulting crystallized wax may be removed more readily from the oil by such methods as cold settling, centrifuging and more particularly by filtering, than can be effected when employing resin-containing asphalts. I have particularly found that the addition of such resin-free asphalts to waxy oils influences the form in which the wax crystallizes from solution upon chilling the oil and that the oil containing the crystallized wax can be readily filtered to separate the crystallized wax from the oil.

On the other hand, I have discovered that when employing as dewaxing aids such asphalts containing substantial quantities of resinous materials such as are present in petroleum residues produced by steam distillation of asphalt base crude oils down to melting points of about 110° F., the resinous materials dissolved in the oil and diluent employed at an elevated temperature precipitate from solution upon chilling to dewaxing temperatures in a plastic state. When the chilled mixture is then passed through the filters, the plastic resinous materials rapidly plug any filters used to separate the precipitated wax from the oil solvent solution and soon render the filter unit inoperable.

I have found that the asphaltic dewaxing aids which are particularly suitable for carrying out the process of my invention are those asphalts having melting points (A. S. T. M. Method D-36—26) of about 150° F. or over and penetrations (A. S. T. M. Method D-5—25) at 77° C. of about 10 or less. Such asphalts can be produced by distilling a California asphalt containing crude oils such as Poso Creek or Santa Fe Springs crude oil or a Mid-Continent crude oil, until a penetration on the residue of about 10 or less at about 77° F. and a melting point of about 150° F. or over is reached on the residue. The distillation may be accomplished with the aid of steam and/or vacuum. It has been found that by effecting the distillation of the crude oil down to hard asphalts of the above characteristics, the resinous materials normally contained in the heavier fractions of the crude oil are nearly completely eliminated from the asphalt whereas if the distillation is stopped so as to produce a softer grade of asphalt such as a "D" grade asphalt having a melting point of 105 to 120° F. and a penetration at 77° F. of about 40 to 90, the resulting asphalt will contain large quantities of resinous materials which cause the aforementioned difficulties of plugging of filters employed to separate the precipitated wax from the oil and diluent.

As a specific example, but without intending to limit my invention thereto, I will describe the application of my invention to dewaxing an S. A. E. 50 lubricating oil distillate obtained by vacuum distillation of a Santa Fe Springs crude oil. As a dewaxing aid, I will describe the use of an asphalt obtained by vacuum distillation of a Poso Creek crude oil down to a penetration of bout 3 to 5 at 77° F. and a melting point of about 200° F. A small amount of this asphalt was first mixed with the lubricating oil at a temperature of about 150° F. and the resulting mixture was then mixed with approximately 2.50 volumes of liquid propane under superatmospheric pressure. The temperature of the resulting mixture was about 70° F. and the pressure was about 217 lbs. per square inch. The asphalt was introduced into the lubricating oil as a concentrated solution containing equal parts of the asphalt and the same character of lubricating oil as the oil to be dewaxed although other oils capable of dissolving the asphalt may be employed. The amount of this concentrated solution mixed with the oil to be dewaxed was such as to incorporate approximately 1½% by volume of the asphalt based upon the final solution of propane and waxy lubricating oil. The mixture of waxy lubricating oil, propane and asphalt was then chilled to approximately −40° F., the refrigeration being accomplished by vaporizing, under gradually reduced pressure, a portion of the propane until the pressure in the chilling column reached approximately 0 lbs. gauge which corresponds to a temperature of the mixture of about −40° F. During the chilling of the mixture, make-up propane at about 20° F. was introduced into the chilling column at such rate as to compensate for the portion vaporized during the chilling and to maintain a constant ratio of about 2.50 volumes of propane to one volume of the oil.

The chilled slurry of propane, lubricating oil, wax and asphalt was then passed through a filter to effect the separation of the precipitated wax and dewaxing aid from the propane and lubricating oil. The filtrate was then distilled to remove the propane, the latter being recovered by compression and cooling and returned to the propane storage tank for further use.

By way of more particularly illustrating the advantages obtained by employing such hard asphalts mentioned herein as dewaxing aids, I was able to operate the filter at a rate of approximately 0.7 gallons per square foot of filter surface per hour and obtained a yield of approximately 80%. Filtration at such a rate was carried out for approximately seven days without intermediate washing of the filter cloths because of plugging by the resinous materials. However, as in all filter operations, the wax was sloughed off the filter elements periodically by flexing the canvas cloths by the alternate application of superatmospheric pressure and vacuum in the interior of the filter elements.

I have made several other runs on the same S. A. E. 50 stock employing from 1 to 3% of an asphalt having a penetration of 13 to 77° F. and a melting point of 149° F. With the use of this dewaxing aid, the runs were limited to about one day with good filter rates although the runs were usually continued for two or three days but after the first day's operation, the filter rates dropped to 0.2 to 0.3 gallons per square foot per hour and the yields were reduced to about 60 to 65%.

During the operations with this softer type of asphalt as dewaxing aid, a great deal of trouble was experienced in the dewaxing plant due to the accumulation of the resins introduced by the asphalt which resins plugged the lines as well as the filters.

During these operations, samples of the resinous materials which are practically insoluble in the liquid propane at low temperatures were collected and tested. These resins are light brown in color contrasted to the black asphalt from which they are extracted, are very gummy and sticky, have a specific gravity of 1.01, a Saybolt Universal viscosity at 210° F. and 310° F. of 494 seconds and 73 seconds, respectively, a viscosity-gravity constant of 0.940 and a viscosity pour point of 100° F. Therefore, it is particularly desirable to remove such resinous materials from the asphalt prior to its use as a dewaxing aid.

It is, therefore, obvious that by adding such hard asphalts having penetrations of 10 or less and melting points of about 150° F. and above to a wax-containing oil, I obtain the particularly desirable effect of modifying wax crystallization upon chilling of the solution of oil and diluent that the wax precipitated from solution upon chilling may be more readily separated from the oil both with regard to increased filter rates and completeness of separation of wax to obtain high yields of dewaxed oil and also with regard to the length of time which the filter may be operated without washing.

While I have described the use of liquid propane as the diluent refrigerant, it will be observed that I may use other light liquid hydrocarbons which are normally vaporous at ordinary temperatures and pressure. These hydrocarbons include methane, ethane, propane, butane, iso-butane and mixtures thereof. I may also employ other light liquid hydrocarbons as diluents such as naphtha or gasoline. However, I prefer to use propane since it has the dual property of functioning as a solvent or diluent and as a refrigerant.

The foregoing description of my invention is not to be considered as limiting since many variations may be made within the scope of the following claims by those skilled in the art without departing from the spirit thereof.

I claim:

1. A process for dewaxing a wax-containing oil by means of filtration or cold settling which comprises adding a hard asphalt having a melting point above 150° F. and a penetration below 10 at 77° F. to the oil and thereafter separating the wax from the oil.

2. A process for separating wax from oil which comprises mixing the oil with an asphalt having a penetration below 10 at 77° F. and a melting point of above 150° F. and with a hydrocarbon diluent, chilling the mixture to precipitate wax and subsequently filtering the chilled mixture to separate the precipitated wax from the oil and hydrocarbon.

3. A process for separating wax from oil which comprises mixing the oil with an asphalt having a penetration below 10 at 77° F. and a melting point of above 150° F. and with a liquefied normally gaseous hydrocarbon, chilling the mixture to precipitate wax and subsequently filtering the chilled mixture to separate the precipitated wax from the oil and hydrocarbon.

4. A process for separating wax from oil by means of filtration or cold settling which comprises mixing the oil with an asphalt which is substantially free from resinous and viscous oil fractions having Saybolt Universal viscosities below 494 and 73 seconds at 210° F. and 310° F., respectively, chilling the mixture to precipitate the wax contained in the oil and separating the precipitated wax from the oil.

5. A process for separating wax from a wax-bearing oil involving filtration or cold settling which comprises adding a hard asphalt having a penetration of about 3 to 5 at 77° F. and a melting point of about 200° F. to the wax-bearing oil and thereafter separating the wax from the oil.

6. A process for separating wax from wax-bearing oil involving filtration or cold settling which comprises mixing the wax-bearing oil with an asphalt produced by distilling an asphaltic petroleum residue to a penetration below approximately 10 at 77° F. and a melting point above approximately 150° F., chilling the mixture to precipitate wax and separating the precipitated wax and added asphalt from the oil.

BASIL HOPPER.

CERTIFICATE OF CORRECTION.

Patent No. 2,031,108.　　　　　　　　　　　　　　　　February 18, 1936.

BASIL HOPPER.

It is hereby certified that error appears in the printed specification of the above numbered patent requiring correction as follows: Page 2, first column, line 21, for the word "to" read at; and that the said Letters Patent should be read with this correction therein that the same may conform to the record of the case in the Patent Office.

Signed and sealed this 23rd day of June, A. D. 1936.

Leslie Frazer

Acting Commissioner of Patents.

(Seal)